C. SINTZ.
INTERNAL COMBUSTION ENGINE.
APPLICATION FILED APR. 19, 1909.

981,952.

Patented Jan. 17, 1911.

3 SHEETS—SHEET 1.

Witnesses
Inventor
Clark Sintz
By Luther V. Moulton
Attorney

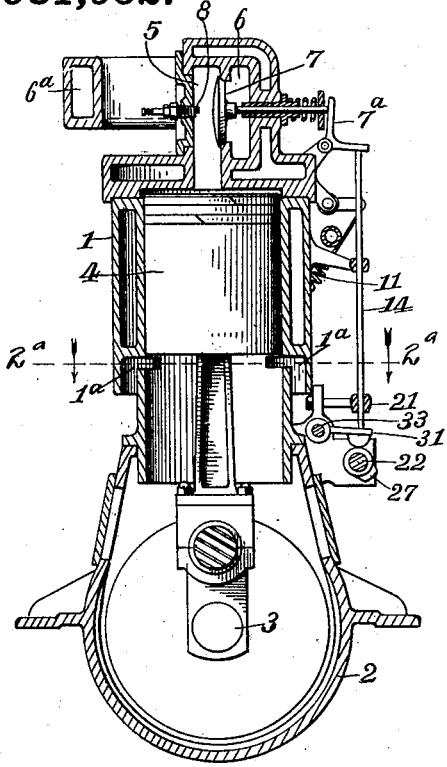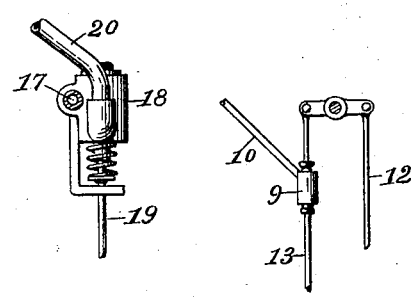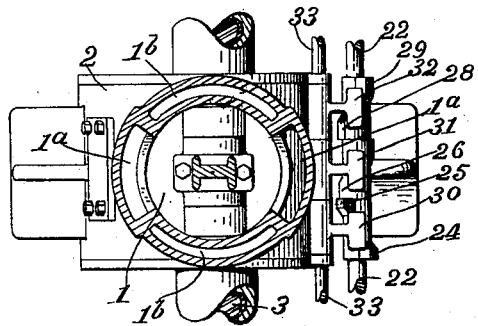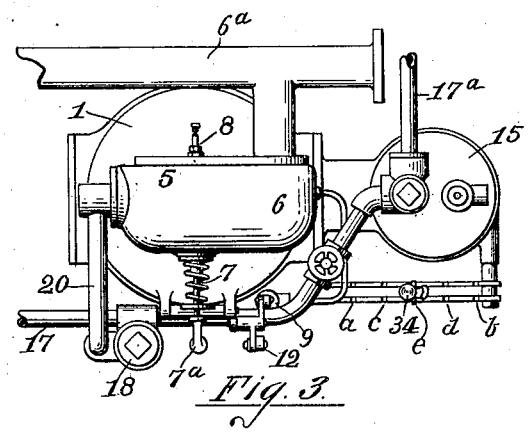

C. SINTZ.
INTERNAL COMBUSTION ENGINE.
APPLICATION FILED APR. 19, 1909.

981,952.

Patented Jan. 17, 1911.

3 SHEETS—SHEET 3.

Witnesses
H. O. Van Antwerp
Palmer A. Jones.

Inventor
Clark Sintz
By Luther V. Moulton
Attorney

UNITED STATES PATENT OFFICE.

CLARK SINTZ, OF NEW ORLEANS, LOUISIANA, ASSIGNOR OF FIFTY-ONE ONE-HUNDREDTHS TO WILLIAM A. GORDON, OF NEW ORLEANS, LOUISIANA.

INTERNAL-COMBUSTION ENGINE.

981,952. Specification of Letters Patent. Patented Jan. 17, 1911.

Application filed April 19, 1909. Serial No. 490,758.

*To all whom it may concern:*

Be it known that I, CLARK SINTZ, a citizen of the United States of America, residing at New Orleans, in the parish of Orleans and State of Louisiana, have invented certain new and useful Improvements in Internal-Combustion Engines; and I do hereby declare the following to be a full, clear, and exact description of the invention, such as will enable others skilled in the art to which it appertains to make and use the same.

My invention relates to improvements in internal combustion engines, and its object is to provide means whereby the engine will be reversible and self starting in either direction, and also to provide the same with improved means for operating the two cycle process of the engine, and to provide the same with various new and useful features, hereinafter more fully described and particularly pointed out in the claims.

Figure 1:
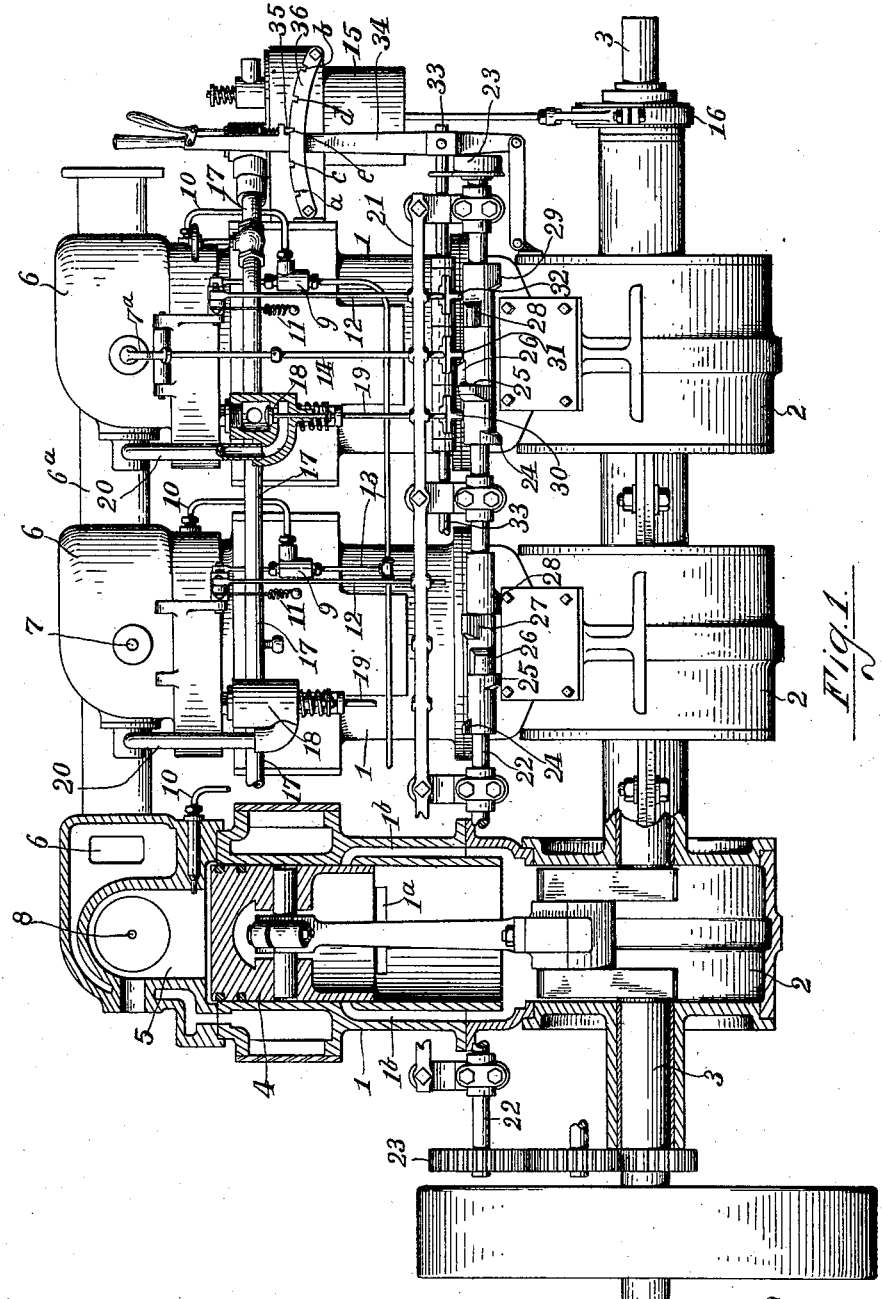
Figure 4:
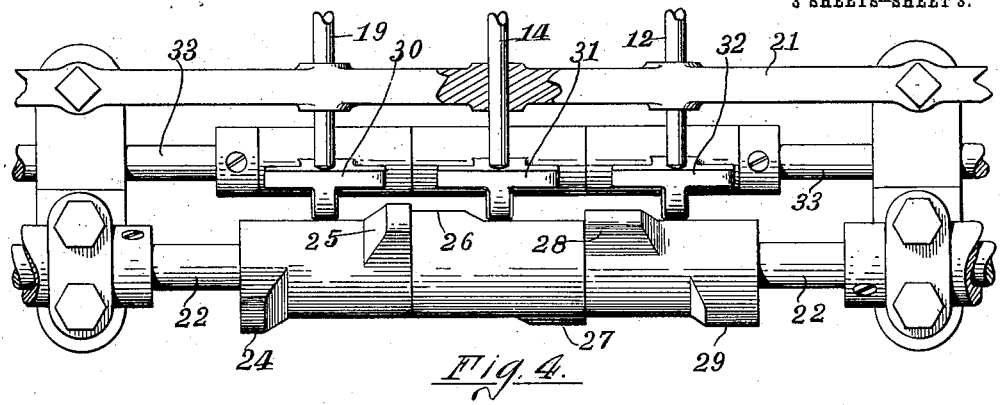
Figure 5:
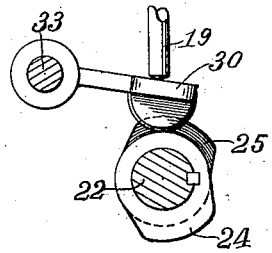
Figure 6:
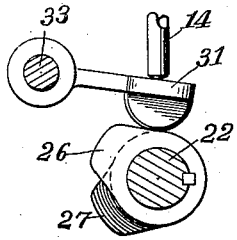
Figure 7:
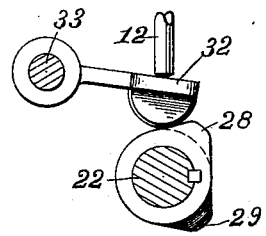

My invention consists essentially of a base compression engine having air inlet and transfer ports controlled by the piston, and also provided with a fuel pump, an exhaust valve, a starting valve, together with a cam shaft having various cams thereon to operate the said valves, and lifters adapted to operate the respective valves and mounted on a longitudinally adjustable rod, whereby said lifters are shifted into engagement with various cams for the purpose of properly operating the valves for running, stopping, starting and reversing the engine, and in various features of combination and arrangement whereby the process of the engine is performed and the engine operated in an improved manner, together with various other features of construction and arrangement, as will more fully appear by reference to the accompanying drawings, in which:

Figure 1. is a side elevation of a three cylinder engine embodying my invention, with parts broken away in vertical section to show the construction of the same; Fig. 2. a transverse section of the same through the axis of one of the cylinders; Fig. 2$^a$ a horizontal section on the line 2$^a$—2$^a$ of Fig. 2; Fig. 3. a plan view of the cylinder at the right of Fig. 1. and adjacent parts; Fig. 4. an enlarged detail of one set of cams, the lifters and valve rods operated thereby and parts adjacent thereto; Figs. 5, 6 and 7, details in transverse section of the various cams shown in Fig. 4; Figs. 8, 9, 10 and 11, diagrammatic details in vertical section showing various positions of the piston and crank at various stages of the process of the engine; Fig. 12 a detail of the starting valve; and, Fig. 13. a detail of the fuel pump.

Like numbers refer to like parts in all of the figures.

The respective cylinders 1 are mounted upon crank cases 2 and in free communication therewith at the lower end, in the axis of which cases is journaled the crank shaft 3. The pistons 4 are connected in the usual way to the crank shaft and reciprocate in the cylinders.

5 is a combustion chamber above each cylinder and freely communicating with the upper end thereof.

6 and 6$^a$ are the exhaust passages communicating with each combustion chamber and closed by an exhaust valve 7 operated by a bell crank lever 7$^a$, and a push rod 14.

Each combustion chamber 5 is provided with the usual spark plug or igniter 8, and 9 represents a fuel pump for each cylinder communicating with each combustion chamber 5 by a pipe 10. Each fuel pump plunger is moved in one direction by a spring 11, and moved in the opposite direction by a push rod 12 and the fuel is supplied to the various pumps by pipes 13 communicating with any convenient reservoir (not shown).

15 is an air pump operated by an eccentric 16 on the crank shaft to force air into any convenient air reservoir (not shown) and with which reservoir a pipe 17 communicates. The pipe 17 is provided with a throttle valve and communicating with said pipe is a starting valve 18 for each cylinder, opened by a push rod 19, and each starting valve communicates with the combustion chamber of the respective cylinder by a pipe 20.

A guide bar 21 is provided through which the rods 12, 14, and 19 extend, being longitudinally movable therein and held in proper position thereby.

22 is a cam shaft driven synchronously with the crank shaft 3 by means of gearing 23. On the end of this cam shaft opposite the gearing is the usual ignition timer 23$^a$ and opposite each cylinder of the engine on said cam shaft is a set of cams adapted to operate the various rods 12, 14 and 19 by means of lifters 30, 31 and 32 respectively. These lifters are mounted and journaled on a longitudinally movable rod 33 and have laterally extended portions adjustably engaging the respective rods 12, 14 and 19, whereby they will operate the respective rods in any adjusted position. When shifted to mid-position the lifters will be engaged by none of the cams, and thus stop the engine, and when shifted either way from the mid-position, will be engaged by the proper cams to properly operate for starting, and running the engine. The rod 33 is shifted and held by a lever 34 provided with a latch 35 engaging notches $a, b, c, d, e$, in a sector 36 to properly shift the lifters for starting, stopping and running the engine as hereafter described. Each set of cams consists of starting cams 24 and 25 to operate the starting valve; exhaust cams 26 and 27 to operate the exhaust valve, and pump cams 28 and 29 to operate the fuel pumps, the even numbered cams being adjusted and operative for starting and running the engine in one direction, and the odd numbered cams adjusted and operative for starting and running the engine in the other direction. The starting cams extend circumferentially sufficient to hold the starting valves open throughout nearly the entire down stroke of the piston. The exhaust cams in like manner extend to hold the exhaust valves open throughout a small fraction of the down stroke and about one-half of the up-stroke of the piston, and the pump cams have but a short circumferential extension, giving the pump a short stroke. The starting cams 24 and 25 are spaced apart far enough to require shifting of the lifter 30 to the full limit to be engaged thereby, and operate only when the latch 35 is in the notches $a$ and $b$, which I call the starting notches. The exhaust cams are spaced apart less and are longer than the starting cams, so that they operate when the latch is either in the starting notches $a$ or $b$, or in the notches $c$ or $d$, which I call the running notches, and all of the cams miss the lifters when the latch is in the middle or center notch $e$. Thus shifting the lever with the latch in the notch $a$ slides the rod 33 and all of the lifters to the left to the extreme limit, the result being that the cams 24, 26, and 28 are brought into action whereby air is used to start the engine in one direction and the fuel pump and exhaust valves properly operated for running in that direction; and when the lever is shifted to bring the latch into the notch $b$, the rod and lifters are shifted in the opposite direction to the limit, thus bringing the corresponding cams 25, 27 and 29 into action to start the engine in the opposite direction by compressed air, and the fuel pump and exhaust valve properly operated to run in this reversed direction. As soon as the engine has established a sufficient speed and the regular running process, the lever is thrown with the latch in either the notch $c$ in the first instance, or in the notch $d$ if started in the opposite direction. This puts the starting valves out of action, discontinues the use of compressed air, and continues the operation of the exhaust valve and fuel pump. Thus the extreme positions of the lever 34, are respectively the starting positions; the respective intermediate positions are the running positions, and the center position of the lever stops the engine. I am thus able by means of the lever 34 to slide the lifters 30, 31 and 32 into operative relation to the cams to start and run the engine in either direction, or to stop and reverse the engine at pleasure, by merely moving a single lever having substantially the same movements as the usual reverse lever of a steam engine of the locomotive type. Obviously the cams may be shifted instead of the lifters without departing from my invention, but the arrangement shown I deem simpler and preferable.

In operating the engine by the normal running process, the air is first taken into the base through the ports $1^a$; compressed therein by the down stroke of the piston, and at the extreme end of the down stroke passes through the transfer ports $1^b$ to the cylinder above the piston. In the meantime, the exhaust valve having opened, the old charge is exhausted on the return or up-stroke of the piston, the exhaust valve being held open until the old charge is well scavenged out. The exhaust valve is then closed and the fuel pump injects fuel into the fresh charge of air, which is compressed into the combustion chamber 5 during the remainder of the up-stroke of the piston, where it is fired at the proper time by the igniter 8.

Figures 8, 9, 10, 11:
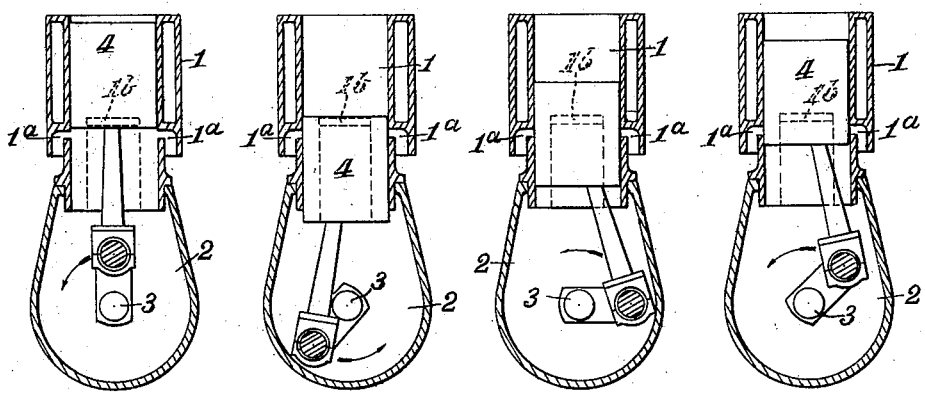

Fig. 8. shows the position of the piston and crank when taking in fresh air and commencing the working or down-stroke; Fig. 9 shows the position of the same at the commencement of the exhaust; Fig. 10 shows the position of the same at the closing of the exhaust and commencement of fuel injection; and Fig. 11 the position at the close of the fuel injection.

It will be noted that the air transferred from the crank case enters the cylinder below the burned charge, and is carried up by the piston and that the exhaust valve remains open during about one-half of the up-stroke of the piston. The old charge is thus well scavenged out, and the fresh charge is only about one-half of a cylinder full, which is then compressed, fired and allowed to expand to about twice the volume of the charge before compression. I thus work the charge by expansion down to a low pressure before exhausting it. This reduces the noise of the exhaust and secures high economy of fuel.

The process of operating and general engine construction herein shown are not herein claimed but are reserved for separate application in view of requirement of division by the Office.

What I claim is:

1. An internal combustion engine, comprising a series of cylinders, separate admission valves operated to run the engine, separate admission valves operated to start the engine, separate cams to operate the starting valves, separate cams to operate the running valves, and shiftable means for transmitting motion from the cams to the valves, said means when in one position being engaged by none of the cams, and when shifted to the full extent therefrom to a second position engaged by all of the cams to operate all of the valves, and when shifted to a third and intermediate position engaged by the cams to operate the running valves only.

2. An internal combustion engine, comprising a series of cylinders, admission valves operated to run the engine, separate admission valves operated to start the engine, two cams for each admission valve alternately operating the same to run the engine in opposite directions, shiftable means for transmitting motion from the cams to the valves, and means for adjusting said shiftable means in five consecutive positions, whereby when said shiftable means is in middle position, none of the valves are operated and when said means is shifted to an end or outward position all of the valves are operated to start and run the engine in the respective direction, and when said means is shifted to either of the intermediate positions the running valves only are operated and the starting valves are out of action.

3. An internal combustion engine, comprising a series of base compression engines each provided with an air intake and a transfer port controlled by the piston, a fuel pump, and exhaust valve, and a starting valve for each engine, means for supplying compressed fluid to the starting valve, means for supplying liquid fuel to the pump, separate cams for operating each valve and pump, simultaneously shiftable means for transmitting motion from each cam, means for shifting the same to three separate positions, in one of which positions the cams are all inoperative, in another of which positions both valves and the pump are operated, and in the other position the pumps and exhaust valves only are operated and the starting valves are out of action.

4. An internal combustion engine, comprising a series of cylinders mounted on separate closed bases and provided with air inlet ports and transfer ports controlled by the pistons, a starting valve, an exhaust valve, and a fuel pump to each cylinder, means for supplying compressed air to the starting valves, means for supplying liquid fuel to the pumps, two cams for alternately operating each valve and pump to operate the engine in opposite directions, simultaneously shiftable means for engaging the respective cams to operate the valves and pumps and adapted to shift to five consecutive positions, whereby when in mid-position all of the cams are inoperative, and when in either of the outer positions all of the valves and pumps are operated and when in either intermediate position, the pumps and exhaust valves only are operated.

5. An internal combustion engine, comprising a series of cylinders, a starting valve and running valve for each cylinder, two cams for each valve, the starting cams being relatively short and spaced apart equal to the outer ends of the running cams, and the latter cams being longer and spaced apart a less distance than the starting cams, lifters for each respective valve mounted on a longitudinally movable rod and simultaneously shifted thereby to mid-position to engage none of the cams, to shift to either end position, to engage cams, to operate all of the valves, to start the engine in either direction and to shift to either mid-position to continue the operation of the running valves and discontinue the operation of the starting valves.

6. A multiple cylinder internal combustion engine comprising a series of cylinders, a cam shaft driven by the engine, separate running cams to operate the engine when running in each direction, starting valves to admit air to the cylinders, separate starting cams to operate the valves to start the engine in either direction, means for simultaneously putting all of the cams out of action, means for simultaneously putting all of each separate set of cams into action during the starting of the engine with air, and means for putting the starting cams only out of action and continuing the action of the running cams after the engine is started.

7. A multiple cylinder internal combustion engine, comprising a series of cylinders each having a starting valve and an exhaust valve, means for supplying fluid under pressure to the starting valves, a cam shaft driven by the engine, two starting cams on the shaft for each valve respectively adjusted for operating the engine in opposite directions, the starting cams being spaced apart to a greater extent than the exhaust cams, and having less length than the running cams, means for shifting all of the cams for starting and running in the respective directions alternately into action, and means for shifting the starting cams only out of action.

8. A multiple cylinder internal combustion engine, comprising a series of cylinders, each having a starting valve, an exhaust valve and a fuel pump, a cam shaft operated by the engine, a set of separate cams on the shaft to operate the respective valves and pumps to both start and run the engine forward, a like separate set of cams to operate the valves and pumps to both start and run the engine backward, shiftable means for alternately and simultaneously connecting all of the forward operating cams, or all of the backward operating cams with the valves and pumps, or disconnecting the starting cams only from the valves, or disconnecting all of the cams from the valves and pumps at pleasure.

9. A multiple cylinder internal combustion engine, comprising a series of cylinders, a starting valve and an exhaust valve for each cylinder, a rod to operate each valve, lifters pivoted on a longitudinally movable rod, and slidably engaging the first named rods, a cam shaft operated by the engine, two cams to each lifter mounted on the shaft and spaced apart, one of said cams for the forward operation of the engine and the other of said cams for the backward operation of the engine, and means for longitudinally shifting the rod to simultaneously bring the lifters opposite all of either set of cams, or between the same at pleasure and means for shifting the rod to move the starting lifters only clear of the cams, leaving the running lifters in the path of the cams.

10. A multiple cylinder internal combustion engine, comprising a series of cylinders each having a starting valve and an exhaust valve, a rod to operate each valve, a lifter to operate each rod each pivoted on a longitudinally movable rod, and having a laterally extended face slidably engaging the respective valve operating rod, a lever to shift the said movable rod and having a latch engaging a notched sector, a cam shaft operated by the engine, two cams on said shaft for each lifter, spaced apart and adjusted respectively for forward and backward operating of the engine, the starting cams having less length and spaced apart farther than the exhaust cams whereby all the cams are put out of action when the lever is in mid-position, and all of the forward or backward operating cams are put in action when the lever is in full forward or backward position, and the starting cams only are put out of action when the lever is in an intermediate position.

11. A multiple cylinder internal combustion engine, comprising a series of cylinders, a starting valve, an exhaust valve, and a fuel pump to each cylinder, a rod to operate each valve and pump, a longitudinally movable rod, a lever to adjust the movable rod, a notched sector to adjust and hold the lever, lifters pivotally mounted on the said movable rod, and adjustably engaging the respective valve and pump rods, a cam shaft operated by the engine, two cams on said shaft for each lifter and spaced apart, one of said cams being adjusted for forward operation of the engine and the other of said cams adjusted for backward operation of the engine, the starter cams being spaced apart farther than the other cams and of less length.

12. A multiple cylinder internal combustion engine, comprising a series of cylinders each having means for starting and operating the engine, said means being operated by rods, lifters laterally adjustable relative to the rods and engaging the same, two cams to alternately engage said lifters and spaced apart, the starting cams being spaced apart to a greater extent than the running cams and having less length, a cam shaft operated by the engine and operating the cams, a longitudinally movable rod on which the lifters are journaled, a lever to adjust the rod, a sector having a series of five notches, a latch on the lever to engage the notches and arranged so that when the latch is in the middle notch all of the cams will run clear of the lifters and when the latch is in the end notches all of the respective forward or backward operating cams will engage all of the lifters, and when the latch is in either of the intermediate notches, the starter cams only will run clear of the respective lifters.

In testimony whereof I affix my signature in presence of two witnesses.

CLARK SINTZ.

Witnesses:
HENRY J. LEIDENHEIMER,
FRANK MACKEY.